(12) United States Patent
Chao et al.

(10) Patent No.: US 11,843,929 B2
(45) Date of Patent: Dec. 12, 2023

(54) TRUE WIRELESS MULTICHANNEL-SPEAKERS DEVICE AND MULTIPLE SOUND SOURCE VOICING METHOD THEREOF

(71) Applicant: Airoha Technology Corp., Hsinchu (TW)

(72) Inventors: Kuan-Li Chao, Taipei (TW); Ho-Hsin Liao, Taipei (TW); I-Ting Lee, Taipei (TW); Kuo-Wei Kao, Taipei (TW); Kai-Yuan Hsiao, Taipei (TW); Wei-Ming Chen, Taipei (TW); Jian-Ying Li, Taipei (TW); Wei-Lin Chang, Taipei (TW); Kuo-Ping Yang, Taipei (TW)

(73) Assignee: AIROHA TECHNOLOGY CORP, Hsinchu (TW)

( * ) Notice: Subject to any disclaimer, the term of this patent is extended or adjusted under 35 U.S.C. 154(b) by 353 days.

(21) Appl. No.: 17/126,097

(22) Filed: Dec. 18, 2020

(65) Prior Publication Data

US 2021/0219057 A1 Jul. 15, 2021

(30) Foreign Application Priority Data

Jan. 15, 2020 (TW) ................................ 109101404

(51) Int. Cl.
*H04R 5/04* (2006.01)
*H04W 56/00* (2009.01)
(Continued)

(52) U.S. Cl.
CPC ................. *H04R 5/04* (2013.01); *H04R 5/02* (2013.01); *H04S 3/008* (2013.01);
(Continued)

(58) Field of Classification Search
None
See application file for complete search history.

(56) References Cited

U.S. PATENT DOCUMENTS

| 10,178,489 B2* | 1/2019 | Sen ......................... H04S 7/308 |
| 2006/0250260 A1* | 11/2006 | Albert ................ G08B 21/0211 |
| | | 340/628 |

(Continued)

FOREIGN PATENT DOCUMENTS

| CN | 102724609 A | 10/2012 |
| CN | 110503984 A | 11/2019 |

*Primary Examiner* — Duc Nguyen
*Assistant Examiner* — Assad Mohammed
(74) *Attorney, Agent, or Firm* — McClure, Qualey & Rodack, LLP

(57) ABSTRACT

A true wireless multichannel-speakers device and a multiple sound-source voicing method thereof are disclosed. The true wireless multichannel-speakers device includes a first and a second sounder. The first and the second sounders respectively include a first and a second sound effect generators, a first and a second sound effect value providers, and a first and a second speakers. The first sound effect value provider provides a first sound effect control value set to the first sound effect generator to generate a first sound effect output signal so that the first speaker outputs the first sound effect output signal. The second sound effect value provider provides a second sound effect control value set to the second sound effect generator to generate a second sound effect output signal so that the second speaker outputs the second sound effect output signal.

24 Claims, 8 Drawing Sheets

(51) Int. Cl.
    *H04S 3/00*        (2006.01)
    *H04R 5/02*        (2006.01)
    *H04B 1/38*        (2015.01)

(52) U.S. Cl.
    CPC ............ *H04W 56/001* (2013.01); *H04B 1/38* (2013.01); *H04R 2420/07* (2013.01); *H04S 2400/01* (2013.01); *H04S 2400/13* (2013.01)

(56) References Cited

U.S. PATENT DOCUMENTS

| | | | | |
|---|---|---|---|---|
| 2010/0141461 | A1* | 6/2010 | Morita | G08B 17/00 |
| | | | | 340/636.15 |
| 2012/0274767 | A1* | 11/2012 | Hornback | H04R 1/025 |
| | | | | 381/77 |
| 2014/0123577 | A1* | 5/2014 | Yarmolinsky | E04F 11/02 |
| | | | | 52/173.1 |
| 2014/0363022 | A1* | 12/2014 | Dizon | H04N 21/43615 |
| | | | | 381/105 |
| 2015/0187194 | A1* | 7/2015 | Hypolite | G08B 17/10 |
| | | | | 340/628 |
| 2017/0033753 | A1* | 2/2017 | Liu | H03G 3/3005 |
| 2018/0130315 | A1* | 5/2018 | Feltham | G08B 7/06 |

\* cited by examiner

| Embodiment | Timeline synchronization method | | Stereo configuration method | |
|---|---|---|---|---|
| | Transmitting synchronous control signal | Transmitting sound effect control value set | Sound effect generator has preset stereo configuration | Sound effect value provider includes a stereo configuration value for each channel |
| 1 | ✓ | - | - | - |
| 2 | (✓) | ✓ | - | - |
| 3 | ✓ | - | ✓ | - |
| 4 | ✓ | - | - | ✓ |
| 5 | (✓) | ✓ | ✓ | - |
| 6 | (✓) | ✓ | - | ✓ |

FIG. 2

TRUE WIRELESS MULTICHANNEL-SPEAKERS DEVICE AND MULTIPLE SOUND SOURCE VOICING METHOD THEREOF

BACKGROUND OF THE INVENTION

1. Field of the Invention

The present invention relates to a true wireless multichannel-speakers device and a multiple sound-source voicing method thereof, particularly to a true wireless multichannel-speakers device capable of independently generating a sound effect signal for each channel and synchronizing the timeline of each sound output, and a multiple sound-source voicing method thereof.

2. Description of the Related Art

With the advancement of technology, many true wireless multichannel-speakers devices have been developed, such as true wireless headphones, wireless home theater and other devices that use near-field communication technologies such as Bluetooth, Wi-Fi or NFC to connect multiple speakers to the host. In addition to receiving sound signals from external electronic devices, known wireless speaker devices have developed a wireless speaker device technology that can generate sound effects on their own. This technology can output sound when the wireless speaker device is not connected to an external electronic device. One of the application scenarios can be that a speaker device can output natural sound effects such as the sounds of ocean waves and raindrops without any Bluetooth wireless connection. In the prior art, a wireless speaker device capable of generating sound effects usually generates sound effects from the sounding end of one side and then transmits the sound effects to the other sounding end. However, this method consumes too much energy and easily leads to insufficient battery power of the wireless headset device. Another technology is to store sound effects on the respective sounding ends. As a result, the stored sound effects are limited, difficult to customize, and difficult for users to interact with. Moreover, taking natural sound effects as an example, the user experience of noise blocking and sleep may be disturbed by continuously listening to limited natural sound effects.

Therefore, it is necessary to provide a new true wireless multichannel-speakers device and a multiple sound-source voicing method thereof to solve the problem in the prior art.

SUMMARY OF THE INVENTION

It is a primary objective of the present invention to provide a true wireless multichannel-speakers device capable of independently generating a sound effect signal for each channel and synchronizing the timeline of each sound output.

It is another objective of the present invention to provide a multiple sound-source voicing method used for the above device.

To achieve the above objectives, a true wireless multichannel-speakers device of the present invention at least includes a first sounder and a second sounder. The first sounder includes a first sound effect generator, a first sound effect value provider, and a first wireless transceiver and first speaker. The first sound effect value provider provides a first sound effect control value set to the first sound effect generator to generate a first sound effect output signal so that the first speaker outputs the first sound effect output signal. The second sounder includes a second sound effect generator, a second sound effect value provider, a second wireless transceiver, and a second speaker. The first sounder and the second sounder are connected via a first wireless transceiver and a second wireless transceiver. The second sound effect value provider provides a second sound effect control value set to the second sound effect generator to generate a second sound effect output signal so that the second speaker outputs the second sound effect output signal.

The multiple sound-source voicing method in the present invention includes the following steps: providing a first sound effect control value set to a first sound effect generator through a first sound effect value provider to generate a first sound effect output signal; enabling the first speaker to output the first sound effect output signal; providing a second sound effect control value set to a second sound effect generator through a second sound effect value provider to generate a second sound effect output signal; and enabling the second speaker to output the second sound effect output signal.

BRIEF DESCRIPTION OF THE DRAWINGS

FIG. 2 is a comparison chart showing differences between embodiments of the present invention;

DETAILED DESCRIPTION OF THE PREFERRED EMBODIMENTS

Hereafter, the technical content of the present invention will be better understood with reference to preferred embodiments.

Figure 1:
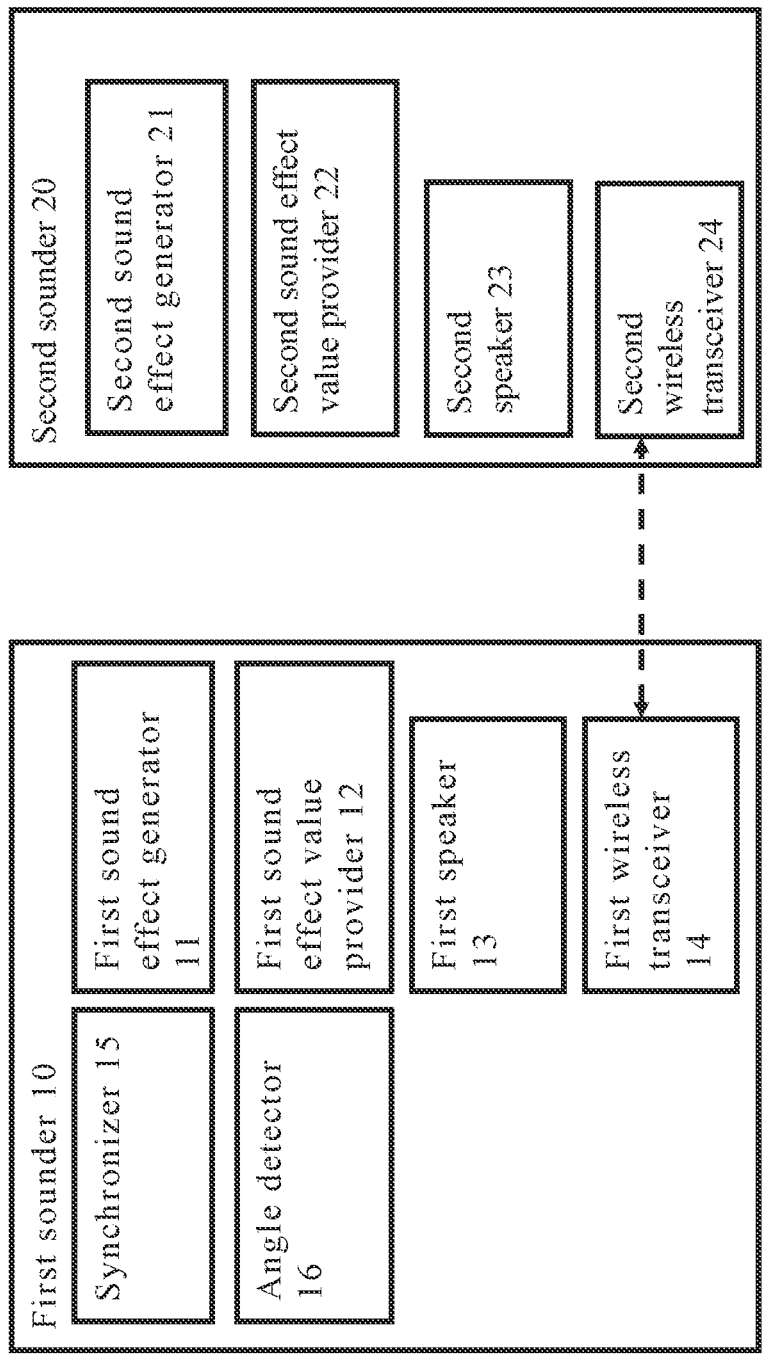
FIG. 1 is an architecture diagram of a true wireless multichannel-speakers device of the present invention.

Hereafter, please refer to FIG. 1 for an architecture diagram of a true wireless multichannel-speakers device in the present invention.

In an embodiment of the present invention, a true wireless multichannel-speakers device 1 can receive sound signals from external electronic devices (not shown) in a wireless manner. The true wireless multichannel-speakers device 1 at least includes a first sounder 10 and a second sounder 20 connected to each other wirelessly, such as a true wireless headset, but the present invention is not limited thereto. The present invention can also have a plurality of sounders. The first sounder 10 includes a first sound effect generator 11, a first sound effect value provider 12, a first speaker 13, a first wireless transceiver 14, a synchronizer 15, and an angle detector 16. The second sounder 20 includes a second sound effect generator 21, a second sound effect value provider 22, a second speaker 23, and a second wireless transceiver 24. The first sounder 10 and the second sounder 20 can be wirelessly connected via the first wireless transceiver 14 and the second wireless transceiver 24 by using near-field communication technology such as Bluetooth, Wi-Fi or NFC, but the present invention is not limited to the ways listed above. In addition to receiving sound signals from external electronic devices, both the first sounder 10 and the second sounder 20 can generate sound signals independently. The first sound effect value provider 12 provides a first sound effect control value set to the first sound effect generator 11, and the second sound effect value provider 22 provides a second sound effect control value set to the second sound effect generator 21. The first sound effect value provider 12 and the second sound effect value provider 22 are the same type of module and can store the preset first sound effect control value set and the second sound effect control value set, which may include the stereo sound config value corresponding to each channel number, or the first and second preset value as the first and the second sound effect control value set. The first sound effect value provider 12 and the second sound effect value provider 22 can both be random number generators at the same time, thereby generating the first sound effect control value set or the second sound effect control value set, respectively. In addition, the first sound effect value provider 12 and the second sound effect value provider 22 can also receive the values of the detectors at the same time, such as the value returned by the angle detector 16 as the first sound effect control value set or the second sound effect control value set. However, the present invention is not limited to the way in which the first sound effect control value set or the second sound effect control value set is generated.

After receiving the first sound effect control value set, the first sound effect generator 11 calculates and generates a first sound effect output signal according to the preset channel number of the first sound effect generator 11 so that the first speaker 13 outputs a first sound effect output signal. Similarly, after receiving the second sound effect control value set, the second sound effect generator 21 calculates and generates a second sound effect output signal according to the preset channel number of the second sound effect generator 21 so that the second speaker 23 outputs the second sound effect output signal. The first sound effect output signal and the second sound effect output signal can be noise blocking sounds such as the sounds of ocean waves and raindrops, but the present invention is not limited thereto. It should be noted that although the first sounder 10 and the second sounder 20 may store the first sound effect control value set or the second sound effect control value set in them, the first sounder 10 and the second sounder 20 may not directly store the first sound effect output signal and the second sound effect output signal.

It should be noted that each module in the true wireless multichannel-speakers device 1 may be configured as a hardware device, software program in combination with hardware device, or firmware in combination with hardware device, but the present invention is not limited to the above manner. Additionally, the preferred embodiment of the present invention described here is only illustrative. To avoid redundancy, not all the possible combinations of changes are documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on various needs. Other modules or elements may not necessarily exist between any two of the modules.

Hereafter, please refer to FIG. 2 that lists embodiments of the present invention and compares their differences. First, the first embodiment and the second embodiment are the synchronous timeline method for multiple sound-source voicing without a stereo design. One embodiment uses a synchronous control signal to synchronize the timeline, and the other embodiment mainly uses a sound effect control value set to synchronize the timeline. After a period of time, if no sound effect control value set is transmitted, a synchronous control signal is transmitted to synchronize the timeline. The third embodiment and fourth embodiment are stereo sound designs for multiple sound-source voicing methods that use the transmission of synchronous control signals to synchronize the timeline. One embodiment provides a stereo configuration method through a sound effect generation module, and the other embodiment provides a stereo configuration method through a sound effect value provider. The fifth embodiment and sixth embodiment are stereo sound designs for multiple sound-source voicing methods that mainly use the transmission of sound effect control value sets to synchronize the timeline. Similarly, when there is no record of value transmission for a period of time, a synchronous control signal is transmitted to synchronize the timeline. One embodiment provides a stereo configuration method through a sound effect generator, and the other embodiment provides a stereo configuration method through a sound effect value provider.

To control the timeline of multiple-channel sound output, the present invention designs a method capable of synchronizing the timeline. Taking a two-channel true wireless headset as an example, a synchronous control signal is generated by the synchronizer 15 of the first sounder 10. This synchronization signal is transmitted to the first sound effect value provider 12 and transmitted from the first wireless transceiver 14 to the second wireless transceiver 24 so that the second sound effect value provider 22 of the second sounder 20 obtains the synchronous control signal. The first wireless transceiver 14 and the second wireless transceiver 24 can use near-field communication technology such as Bluetooth, Wi-Fi or NFC to transmit synchronous control signals, but the present invention is not limited thereto. The synchronous control signal can control the first sound effect control value set and the second sound effect control value set to synchronize the timelines of the first sound effect output signal and the second sound effect output signal so that the timelines of the first sound effect output signal and the second sound effect output signal are the same. Therefore, in the present embodiment, the synchronous control signal allows the first speaker 13 and the second speaker 23 to output the first sound effect output signal and the second sound effect output signal with the same timeline.

Figure 3:
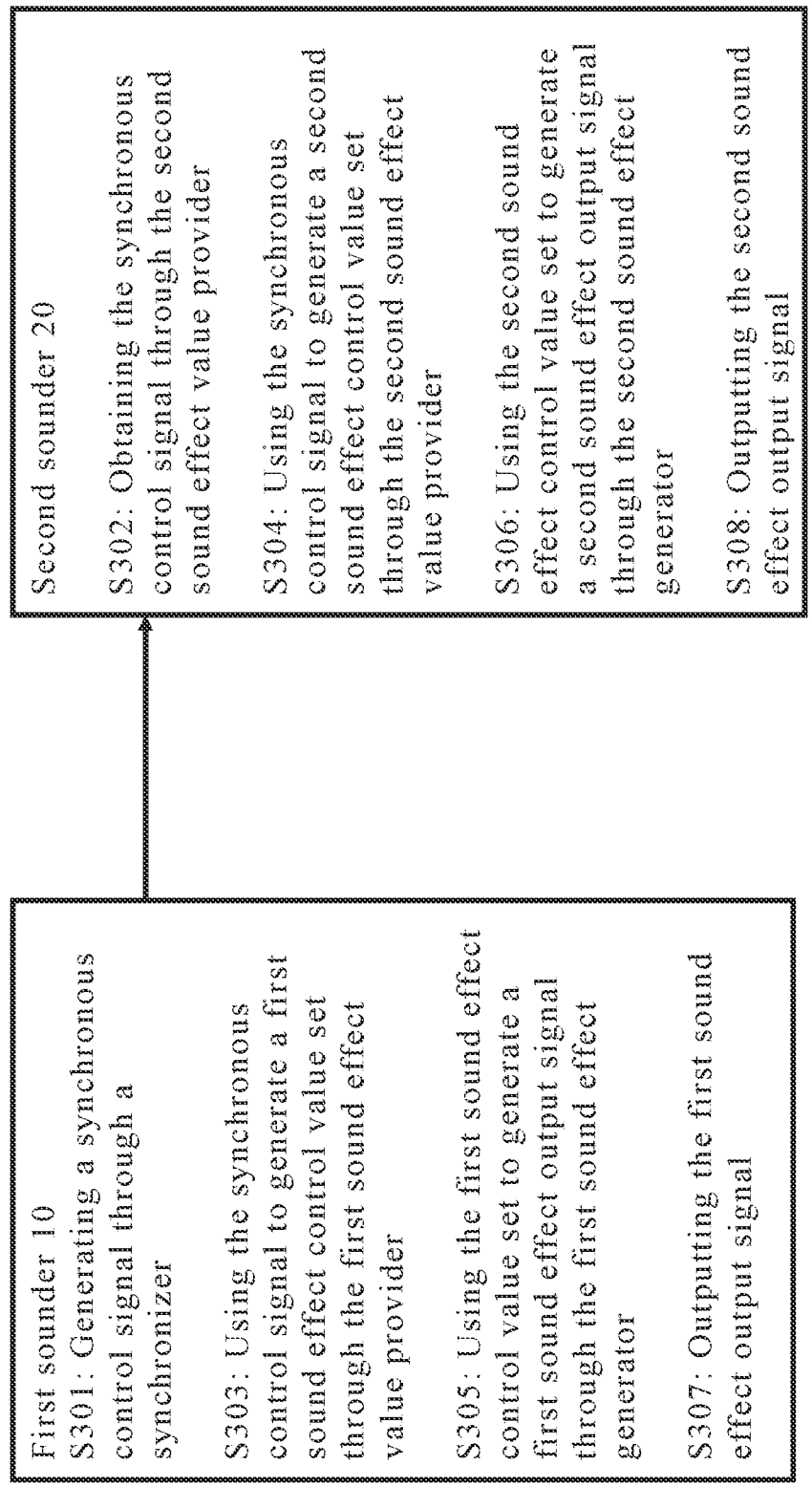
FIG. 3 is a flowchart showing steps of timeline synchronization of a multiple sound-source voicing method in a first embodiment of the present invention.

As to the first embodiment of the present invention, please refer to FIG. 3 for a flowchart showing steps of timeline synchronization of a multiple sound-source voicing method in the first embodiment of the present invention. It should be noted here that although the above true wireless multichannel-speakers device 1 is used as an example to describe the equalizer adjustment method of the present invention, the multiple sound-source voicing method of the present invention is not limited to the true wireless multichannel-speakers device 1 using the same structure above.

First, to control the timeline of multiple channel sound output, the first sounder 10 proceeds with Step S301: Generating a synchronous control signal through a synchronizer.

At this time, the synchronizer 15 generates a synchronous control signal. The first wireless transceiver 14 of the first sounder 10 transmits the synchronous control signal to the second wireless transceiver 24 of the second sounder 20. Accordingly, the second sounder can proceed with Step S302: Obtaining the synchronous control signal through the second sound effect value provider.

At this time, the second sound effect value provider 22 of the second sounder 20 receives the synchronous control signal. The first sounder 10 and the second sounder 20 then proceed with Step S303: Using the synchronous control signal to generate a first sound effect control value set through the first sound effect value provider, and Step S304: Using the synchronous control signal to generate a second sound effect control value set through the second sound effect value provider.

The first sound effect value provider 12 of the first sounder 10 provides the first sound effect control value set to the first sound effect generator according to the synchronous control signal 11. Also, the second sound effect value provider 22 of the second sounder 20 provides second sound effect control value set to the second sound effect generator 21 according to the synchronous control signal. Specifically, the first sound effect control value set and the second sound effect control value set can be the same value or different values.

Then the method proceeds with Step S305: Using the first sound effect control value set to generate a first sound effect output signal through the first sound effect generator, and Step S306: Using the second sound effect control value set to generate a second sound effect output signal through the second sound effect generator.

If the first sound effect control value set and the second sound effect control value set are the same, it means that the first sound effect control value set and the second sound effect control value set both contain signal encoding information for all channels. This makes the process of generating sound more flexible. In this embodiment, after the first sound effect generator 11 receives the first sound effect control value set, a first sound effect output signal is calculated and generated according to the channel number. Similarly, after the second sound effect generator 21 receives the second sound effect control value set, a second sound effect output signal is calculated and generated according to the channel number.

If the first sound effect control value set and the second sound effect control value set are different, it means that the first sound effect control value set and the second sound effect control value set each contain only the signal encoding information of the channel to which each belongs. This makes the process of generating sound faster and more efficient. In this embodiment, after receiving the first sound effect control value set of the exclusive first channel, the first sound effect generator 11 can directly calculate and generate the first sound effect output signal. Similarly, after receiving the second sound effect control value set of the exclusive second channel, the second sound effect generator 21 can directly calculate and generate a second sound effect output signal.

Finally, the method proceeds with Step S307: Outputting the first sound effect output signal and Step S308: Outputting the second sound effect output signal.

Last, the first speaker 13 outputs the first sound effect output signal, and the second speaker 23 outputs the second sound effect output signal.

Accordingly, both the first sounder 10 and the second sounder 20 can generate sound signals independently. The first sound effect output signal and the second sound effect output signal can be the same or different, but the present invention is not limited thereto.

To control the time axis of the multiple-channel audio output, the present invention designs another method capable of synchronizing the timeline. Taking a two-channel true wireless headset as an example, the first sound effect value provider 12 of the first sounder 10 is used to generate a first sound effect control value set and a second sound effect control value set. On the one hand, it transmits the first sound effect control value set to the first sound effect generator 11. On the other hand, it transmits the second sound effect control value set to the second wireless transceiver 24 by the first wireless transceiver 14 so that the second sound effect value provider 22 of the second sounder 20 obtains the second sound effect control value set and provides it to the second sound effect generator 21. At this time, the second sound effect value provider 22 only has the function of receiving and transmitting sound effect control value sets. The first wireless transceiver 14 and second wireless transceiver 24 can use near-field communication technologies such as Bluetooth, Wi-Fi or NFC to transmit the second sound effect control value set, but the present invention is not limited thereto. During the transmission of the second sound effect control value set, the transmission time point of the first wireless transceiver of the first sounder and the reception time point of the second wireless transceiver of the second sounder can be calculated so that the timeline can be synchronized by the two devices. The timeline of the first sound effect output signal and the second sound effect output signal is synchronized so that the timelines of the first sound effect output signal and the second sound effect output signal are the same. However, if there is no value transmission record for a period of time, the first embodiment can be used to transmit the synchronous control signal method to synchronize the timeline. Therefore, in this embodiment, transmitting the second sound effect control value set as well as transmitting the synchronous control signal enables the first speaker 13 and the second speaker 23 to output the first sound effect output signal and the second sound effect output signal with the same timeline.

Figure 4:
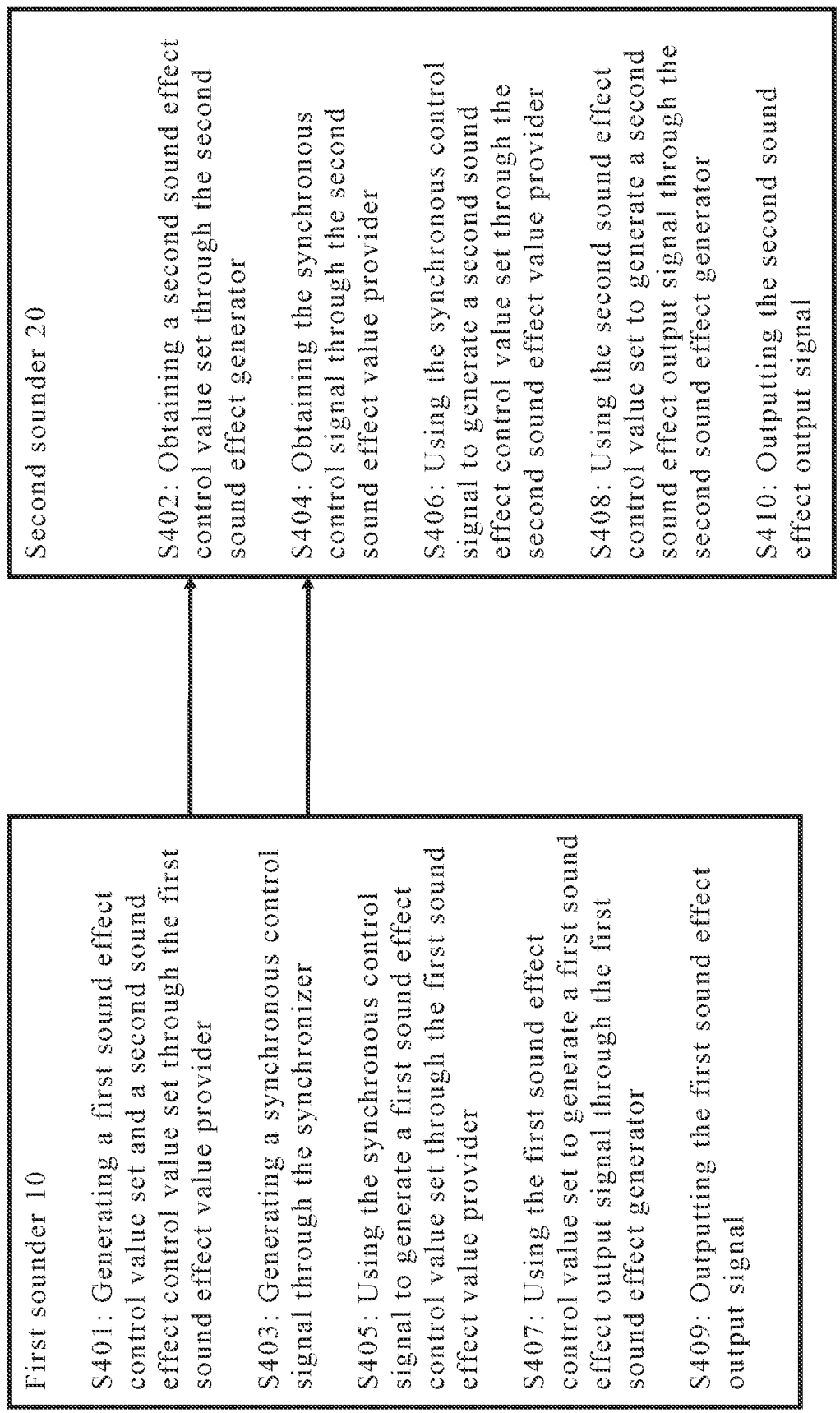
FIG. 4 is a flowchart showing steps of timeline synchronization of a multiple sound-source voicing method in a second embodiment of the present invention.

As to the second embodiment of the present invention, please refer to FIG. 4 for a flowchart showing steps of timeline synchronization of a multiple sound-source voicing method in the second embodiment of the present invention.

First, to control the timeline of multiple sound channel output, the first sounder 10 proceeds with Step S401: Generating a first sound effect control value set and a second sound effect control value set through the first sound effect value provider.

As described in the first embodiment, the first sound effect control value set and the second sound effect control value set may be the same value or different values. At this time, the first sound effect value provider 12 generates a first sound effect control value set and a second sound effect control value set, and the first wireless transceiver 14 of the first sounder 10 sends the second sound effect control value set to the second wireless transceiver 24 of the second sounder 20.

Accordingly, the second sounder 20 can proceed with Step S402: Obtaining a second sound effect control value set through the second sound effect generator.

At this time, the second sound effect value provider 22 of the second sounder 20 receives the second sound effect control value set and then provides it to the second sound effect value provider 12.

If there is no transmission record of the second sound effect control value set in a certain period of time, the synchronous control signal method of the first embodiment can be used to synchronize the timeline. The first sounder 10 can proceed with Step S403: Generating a synchronous control signal through the synchronizer, and S405: Using the synchronous control signal to generate a first sound effect control value set through the first sound effect value provider. The second sounder 20 proceeds with Step S404: Obtaining the synchronous control signal through the second sound effect value provider, and S406: Using the synchronous control signal to generate a second sound effect control value set through the second sound effect value provider.

Since Step S403 to Step S406 are the same as Step S301 to Step S304, they will not be described in detail hereafter.

It should be noted that the first sounder 10 and the second sounder 20 can directly proceed with Step S407 and Step S408 either after Step S402 or after Step S406. Accordingly, the first sounder 10 and the second sounder 20 respectively proceed with Step S407: Using the first sound effect control value set to generate a first sound effect output signal through the first sound effect generator, S408: Using the second sound effect control value set to generate a second sound effect output signal through the second sound effect generator, S409: Outputting the first sound effect output signal, and S410: Outputting the second sound effect output signal.

Since Step S407 to Step S410 are the same as Step S305 to Step S308, they will not be described in detail hereafter.

A stereo sound design method using multiple sound-source voicing to synchronize the timeline by transmitting a synchronous control signal in the third embodiment of the present invention will be described hereafter. This embodiment provides a stereo configuration method through a sound generator. The first sound effect generator 11 and the second sound effect generator 21 have a preset stereo configuration for the channel to which they belong. After receiving the sound effect control value set from the first sound effect value provider 12 and the second sound effect value provider 22, each module is processed to generate sounds of different channels. Therefore, in this embodiment, the first sound effect generator 11 and the second sound effect generator 21 are different sound effect generators. The first sound effect output signal generated by the first sound effect generator 11 includes at least a first stereo sound output signal, and the second sound effect output signal generated by the second sound effect generator 21 includes at least a second stereo sound output signal. The first stereo sound output signal and the second stereo sound output signal are designed to be corresponding stereo sound output signals. In a third embodiment of the present invention, after the timeline is synchronized, the time that the first speaker 13 outputs the first stereo sound output signal is m seconds later than the time that the second speaker 23 outputs the second stereo sound output signal, where $0.0000001 \leq m \leq 0.3$ s. In addition, the gain value of the first stereo sound output signal output by the first speaker 13 can be less than the gain value of the second stereo sound output signal output by the second speaker 23. Accordingly, the user will hear the second sound effect output signal of the second speaker 23 first and then the first sound effect output signal of the first speaker 13, just as the sound source is moved from the position of the second speaker 23 to the position of the first speaker 13.

Figure 5:
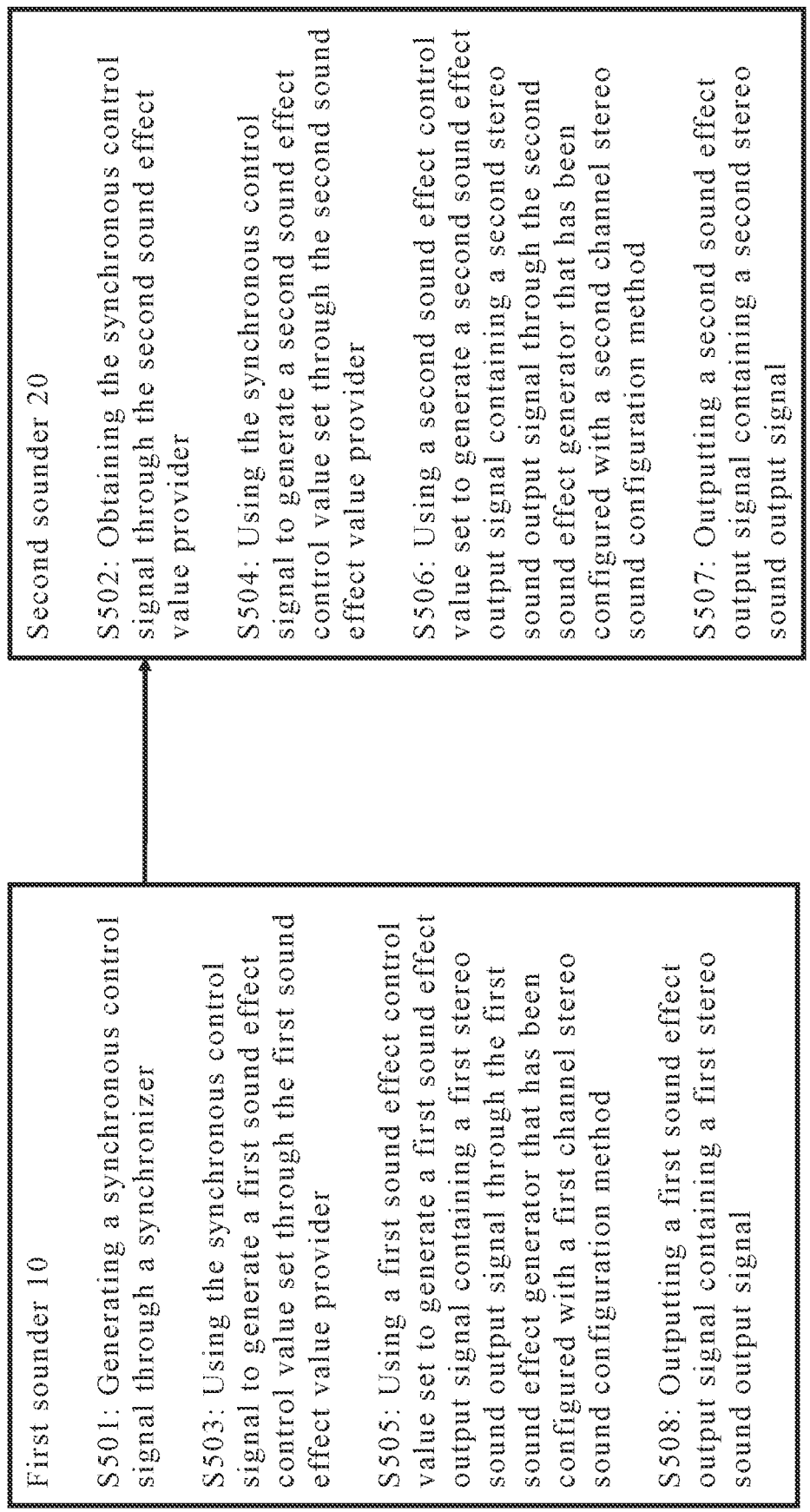
FIG. 5 is a flowchart showing steps of a multiple sound-source voicing method with a stereo sound design in a third embodiment of the present invention.

As to the third embodiment of the present invention, please refer to FIG. 5 for a flowchart showing steps of a multiple sound-source voicing method with a stereo sound design in the third embodiment of the present invention.

First, to control the timeline of multiple channel sound output, the first sounder 10 proceeds with Step S501: Generating a synchronous control signal through a synchronizer. Then the second sounder 20 proceeds with Step S502: Obtaining the synchronous control signal through the second sound effect value provider. Next, the first sounder 10 and the second sounder 20 respectively proceed with Step S503: Using the synchronous control signal to generate a first sound effect control value set through the first sound effect value provider, and Step S504: Using the synchronous control signal to generate a second sound effect control value set through the second sound effect value provider. Specifically, the first sound effect control value set and the second sound effect control value set can be the same value or different values.

Since Step S501 to Step S504 are the same as Step S301 to Step S304, they will not be described in detail hereafter.

Then the method proceeds with Step S505: Using a first sound effect control value set to generate a first sound effect output signal containing a first stereo sound output signal through the first sound effect generator that has been configured with a first channel stereo sound configuration method, and Step S506: Using a second sound effect control value set to generate a second sound effect output signal containing a second stereo sound output signal through the second sound effect generator that has been configured with a second channel stereo sound configuration method.

If the first sound effect control value set and the second sound effect control value set are the same, it means that the first sound effect control value set and the second sound effect control value set both contain signal encoding information of all channels. This makes the process of generating sound more flexible. In this embodiment, after receiving the first sound effect control value set, the first sound effect generator 11 that has been configured with a first channel stereo sound configuration method calculates and generates a first sound effect output signal containing a first stereo sound output signal. Similarly, after receiving the second sound effect control value set, the second sound effect generator 21 that has been configured with a second channel stereo sound configuration method calculates and generates a second sound effect output signal containing a second stereo sound output signal.

If the first sound effect control value set and the second sound effect control value set are different, it means that the first sound effect control value set and the second sound effect control value set each contain only the signal encoding information of the channel to which each belongs. This makes the process of generating sound faster and more efficient. In this embodiment, after receiving the first sound effect control value set of the exclusive first channel, the first sound effect generator 11 that has been configured with a first channel stereo sound configuration method can directly calculate and generate the first sound effect output signal containing the first stereo sound output signal. Similarly, after receiving the second sound effect control value set of the exclusive second channel, the second sound effect generator 21 that has been configured with a second channel stereo sound configuration method can directly calculate and generate the second sound effect output signal containing the second stereo sound output signal.

The first stereo sound output signal and the second stereo sound output signal are designed to be corresponding stereo sound output signals. In addition, the first sound effect generator 11 and the second sound effect generator 21 have the pre-configured audio processing method for the channels to which they belong. Therefore, the generated first sound effect output signal and second sound effect output signal have different sounds in different channels.

Finally, the method proceeds with Step S507: Outputting a second sound effect output signal containing a second stereo sound output signal, and Step S508: Outputting a first sound effect output signal containing a first stereo sound output signal.

After synchronizing the timeline, the time that the first stereo sound output signal output by the first speaker 13 is m seconds later than the time that the second stereo sound output signal output by the second speaker 23, where $0.0000001 \leq m \leq 0.3$ s. Accordingly, the user will hear the second stereo sound output signal of the second speaker 23 first and then the first stereo sound output signal of the first speaker 13, but the present invention is not limited thereto.

Transmitting a synchronous control signal to synchronize the timeline using the stereo sound design of multiple sound-source voicing method in the third embodiment and the fourth embodiment of the present invention will be described hereafter. The difference between the third embodiment and the fourth embodiment is that the fourth embodiment provides a stereo sound configuration method by the sound effect control value set generated by the sound effect value provider. The first sound effect control value set generated by the first sound effect value provider 12 includes the first channel stereo configuration code, and the second sound effect control value set generated by the second sound effect value provider 22 includes the second channel stereo configuration code. The stereo configuration code represents the corresponding stereo configuration method of the channel. Similarly, the first sound effect control value set and the second sound effect control value set may be the same value or different values. Therefore, in this embodiment, the first sound effect generator 11 and the second sound effect generator 21 are the same sound effect generator.

Figure 6:
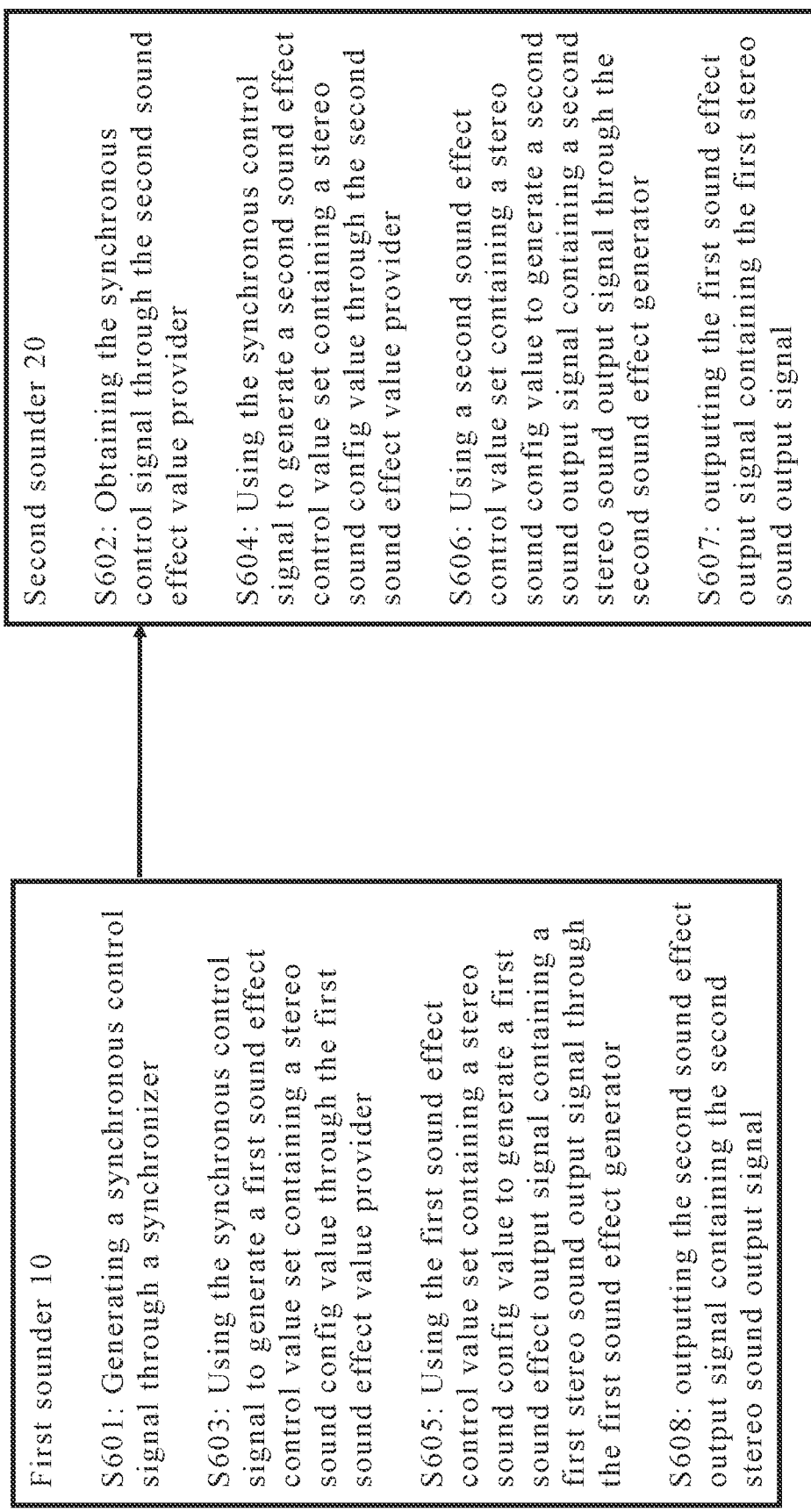
FIG. 6 is a flowchart showing steps of a multiple sound-source voicing method with a stereo sound design in a fourth embodiment of the present invention.

Hereafter, please refer to FIG. 6 for a flowchart showing steps of a multiple sound-source voicing method with a stereo sound design in a fourth embodiment of the present invention.

Compared with the third embodiment shown in FIG. 5, Steps S603 to S606 of the fourth embodiment are different from Steps S503 to S506, and all other steps are the same. Thus, after Step S601 and Step S602, the method proceeds with Step S603: Using the synchronous control signal to generate a first sound effect control value set containing a stereo sound config value through the first sound effect value provider, and Step S604: Using the synchronous control signal to generate a second sound effect control value set containing a stereo sound config value through the second sound effect value provider.

The difference from Step S503 and Step S504 is that the generated first sound effect control value set and the second sound effect control value set contain a stereo sound config value. Thus, it is possible to proceed to Step S605: Using the first sound effect control value set containing a stereo sound config value to generate a first sound effect output signal containing a first stereo sound output signal through the first sound effect generator, and Step S606: Using a second sound effect control value set containing a stereo sound config value to generate a second sound output signal containing a second stereo sound output signal through the second sound effect generator.

If the first sound effect control value set and the second sound effect control value set are the same, it means that the first sound effect control value set and the second sound effect control value set both contain signal encoding information for all channels. This makes the process of generating sound more flexible. In this embodiment, after receiving the first sound effect control value set containing stereo sound config value, the first sound effect generator 11 calculates a first channel stereo sound configuration parameter corresponding to the first sound effect control value set pairing according to the channel number to generate a first sound effect output signal containing a first stereo sound output signal. Similarly, after receiving the second sound effect control value set containing a stereo sound config value, the second sound effect generator 21 calculates the second channel stereo sound config parameter corresponding to the second sound effect control value set pairing according to the channel number to generate a second sound effect output signal containing a second stereo sound output signal.

If the first sound effect control value set and the second sound effect control value set are different, it means that the first sound effect control value set and the second sound effect control value set each include only the signal encoding information of the channel to which each belongs. This makes the process of generating sound faster and more efficient. In this embodiment, after receiving the first sound effect control value set containing the first stereo sound config value of the exclusive first channel, the first sound effect generator 11 can directly calculate and generate the first sound effect output signal containing the first stereo sound output signal. Similarly, after receiving the second sound effect control value set containing the second stereo sound config value of the exclusive second channel, the second sound effect generator 21 can directly calculate and generate the second sound effect output signal containing the second stereo sound output signal.

Accordingly, each channel can generate a corresponding first sound effect output signal containing a first stereo sound output signal and a second sound effect output signal containing a second stereo sound output signal. Finally, the method proceeds with Step S607: outputting the first sound effect output signal containing the first stereo sound output signal, and Step S608: outputting the second sound effect output signal containing the second stereo sound output signal.

The use of transmitting a sound effect control value set as well as the use of transmitting a synchronous control signal to synchronize the timeline by a stereo sound design of multiple sound-source voicing method in the fifth embodiment of the present invention will be described hereafter. This embodiment provides a stereo configuration method by a sound effect generator. The first sound effect generator 11 and second sound effect generator 21 have a preset stereo configuration for the channel to which they belong. After receiving the sound effect control value set, the modules are processed to generate sounds of different channels. Therefore, in this embodiment, the first sound effect generator 11 and the second sound effect generator 21 are different sound effect generators. The first sound effect output signal generated by the first sound effect generator 11 includes at least a first stereo sound output signal, and the second sound effect output signal generated by the second sound effect generator 21 includes at least a second stereo sound output signal. The first stereo sound output signal and the second stereo sound output signal are designed to be corresponding stereo sound output signals. In the fifth embodiment of the present invention, after the timeline is synchronized, the user hears the second sound effect output signal of the second speaker 23 first and then the first sound effect output signal of the first speaker 13, just as the sound source is moved from the position of the second speaker 23 to the position of the first speaker 13.

Figure 7:
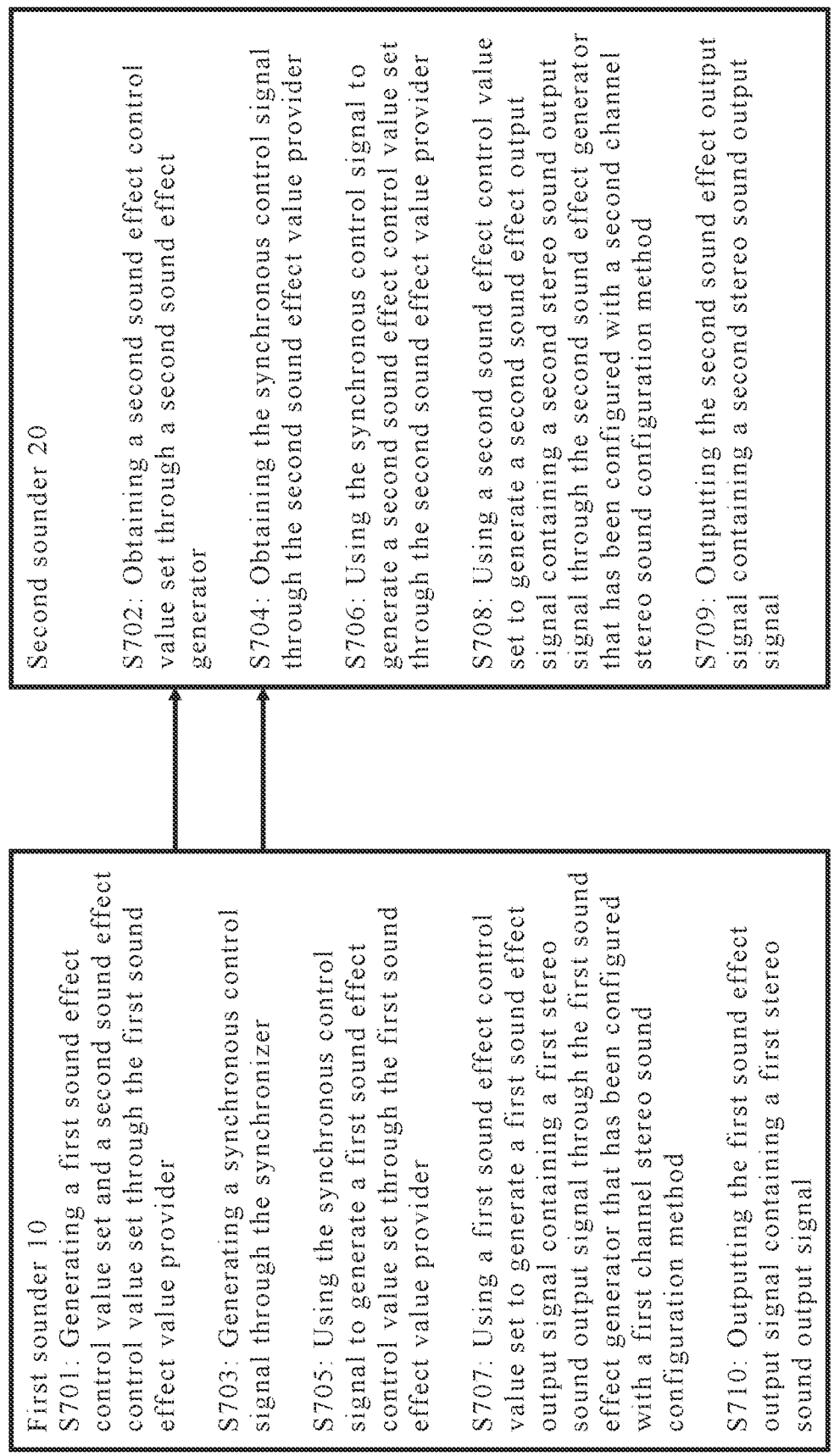
FIG. 7 is a flowchart showing steps of a multiple sound-source voicing method with a stereo sound design in a fifth embodiment of the present invention.

As to the fifth embodiment of the present invention, please refer to FIG. 7 for a flowchart showing steps of a multiple sound-source voicing method with a stereo sound design in the fifth embodiment of the present invention.

First, to control the timeline of multiple channel sound output, the first sounder 10 proceeds with Step S701: Generating a first sound effect control value set and a second sound effect control value set through the first sound effect value provider. Specifically, the first sound effect control value set and the second sound effect control value set can be the same value or different values. The second sounder 20 can proceed with Step S702: Obtaining a second sound effect control value set through a second sound effect generator.

Since Step S701 to Step S702 are the same as Step S401 to Step S402, they will not be described in detail hereafter.

If there is no transmission record of the second sound effect control value set for a period of time, the synchronous control signal method can be used to synchronize the timeline. The first sounder 10 can proceed with Step S703: Generating a synchronous control signal through the synchronizer, and S705: Using the synchronous control signal to generate a first sound effect control value set through the first sound effect value provider. The second sounder 20 can proceed with Step S704: Obtaining the synchronous control signal through the second sound effect value provider, and S706: Using the synchronous control signal to generate a second sound effect control value set through the second sound effect value provider.

Since Step S703 to Step S706 are the same as Step S501 to Step S504, they will not be described in detail hereafter.

It should be noted that the first sounder 10 and the second sounder 20 can directly proceed with Step S707 and Step S708 either after Step S702 or after Step S706. Thus, the first sounder 10 and the second sounder 20 respectively proceed with Step S707: Using a first sound effect control value set to generate a first sound effect output signal containing a first stereo sound output signal through the first sound effect generator that has been configured with a first channel stereo sound configuration method, S708: Using a second sound effect control value set to generate a second sound effect output signal containing a second stereo sound output signal through the second sound effect generator that has been configured with a second channel stereo sound configuration method, S709: Outputting the second sound effect output signal containing a second stereo sound output signal, and S710: Outputting the first sound effect output signal containing a first stereo sound output signal.

Since Step S707 to Step S710 are the same as Step S505 to Step S508, they will not be described in detail hereafter.

The mainly use of transmitting a sound effect control value set and the secondly use of transmitting a synchronous control signal to synchronize the timeline of a multiple sound-source voicing method with a stereo sound design in the sixth embodiment of the present invention which is the same with the fifth embodiment will be described hereafter. The difference between the fifth embodiment and the sixth embodiment is that the sixth embodiment provides a stereo sound configuration method by the sound effect control value set generated by the sound effect numerical module. The first sound effect control value set generated by the first sound effect value provider 12 includes the first channel stereo config code, and the second sound effect control value set generated by the second sound effect value provider 22 includes the second channel stereo configuration code. The stereo configuration code represents the corresponding stereo configuration method of the channel. Similarly, the first sound effect control value set and the second sound effect control value set may be the same value or different values. Therefore, in this embodiment, the first sound effect generator 11 and the second sound effect generator 21 are the same sound effect generator.

Figure 8:
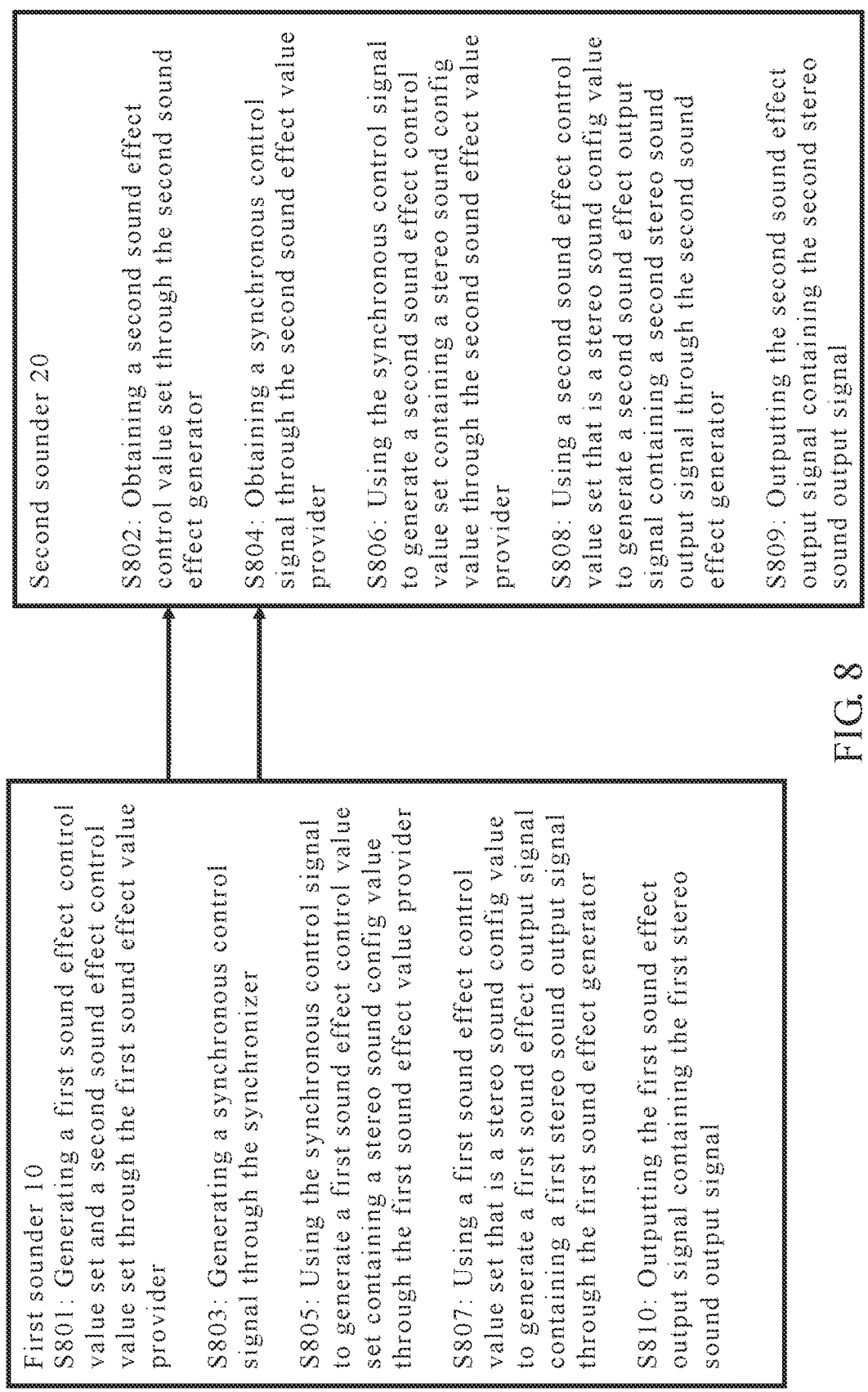
FIG. 8 is a flowchart showing steps of a multiple sound-source voicing method with a stereo sound design in a sixth embodiment of the present invention.

Accordingly, please refer to FIG. 8 for a flowchart showing steps of the stereo sound design of a multiple sound-source voicing method in a sixth embodiment of the present invention.

Compared with the fifth embodiment shown in FIG. 7, only Step S805 to Step S808 in the sixth embodiment are different from Step S705 to Step S708, and the other steps are the same. First, the method proceeds with Step S801: Generating a first sound effect control value set and a second sound effect control value set through the first sound effect value provider, and Step S802: Obtaining a second sound effect control value set through the second sound effect generator.

Since Step S801 to Step S802 are the same as Step S401 to Step S402, they will not be described in detail hereafter.

After Step S801 and Step S802, if there is no transmission record of the second sound effect control value set for a period of time, the synchronous control signal method can be used to synchronize the timeline. The first sounder 10 can proceed with Step S803: Generating a synchronous control signal through the synchronizer, and S805: Using the synchronous control signal to generate a first sound effect control value set containing a stereo sound config value through the first sound effect value provider. The second sounder 20 proceeds with Step S804: Obtaining a synchronous control signal through the second sound effect value provider, and S806: Using the synchronous control signal to generate a second sound effect control value set containing a stereo sound config value through the second sound effect value provider.

Since Step S803 to Step S806 are the same as Step S601 to Step S604, they will not be described in detail hereafter.

It should be noted that the first sounder 10 and the second sounder 20 can directly proceed with Step S807 and Step S808 after Step S801 and Step S802, or proceed with Step S807 and Step S808 after Step S806. Therefore, the first sounder 10 and the second sounder 20 will proceed with Step S807: Using a first sound effect control value set that is a stereo sound config value to generate a first sound effect output signal including a first stereo sound output signal through the first sound effect generator, Step S808: Using a second sound effect control value set that is a stereo sound config value to generate a second sound effect output signal containing a second stereo sound output signal through the second sound effect generator, Step S809: Outputting the second sound effect output signal including the second stereo sound output signal, and S810: Outputting the first sound effect output signal including the first stereo sound output signal.

Since Step S807 to Step S810 are the same as Step S605 to Step S608, they will not be described in detail hereafter.

It should be noted here that the multiple sound-source voicing method of the present invention is not limited to the order of steps of the above six embodiments. As long as the objectives of the present invention can be achieved, the order of the above steps can also be changed.

In another embodiment of the present invention, the first sounder 10 further includes an angle detector 16. The angle detector 16 can be a gyroscope or an angular accelerometer, but the present invention is not limited thereto. When the user wears the first sounder 10, the angle detector 16 is used to detect the rotation angle or tilt angle of the first sounder 10 and the second sounder 20, that is, to detect whether the user's head is rotated or tilted. If the user's head is rotated or tilted, the first sound effect value provider 12 and the second sound effect value provider 22 will receive a value returned by a detector as the first sound effect control value set or the second sound effect control value set. The sound effect control value set is generated according to the user's head movement so that the sound effect control value set of each channel can be used to design the first sound effect output signal and the second sound effect output signal as the corresponding stereo sound output signals according to the rotation angle or the tilt angle. In this way, the user can hear the first sound effect output signal and the second sound effect output signal in conjunction with head movements. For example, when the user hears the first sound effect output signal and second sound effect output signal from left to right, if the user's head turns to the left, the first sound effect generator 11 adjusts the first sound effect output signal and the second sound effect output signal to make the user's hearing experience from front to back.

As described above, according to the above embodiment, the first sounder 10 and the second sounder 20 of the true wireless multichannel-speakers device 1 can independently generate sound effect signals on each channel and synchronize the timeline of each sound output, and at least output the first sound effect output signal and the second sound effect output signal. In addition, in the design of the stereo sound output signal, the sound output signal of each channel has a difference in time and gain value so that users get better hearing effects.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A true wireless multichannel-speakers device, comprising:
   a first sounder, comprising a first sound effect generator, a first sound effect value provider, a first wireless transceiver, and a first speaker, wherein the first sound effect value provider provides first signal encoding information for channels to the first sound effect generator to generate a first sound effect output signal so that the first speaker outputs the first sound effect output signal; and
   a second sounder, comprising a second sound effect generator, a second sound effect value provider, a second wireless transceiver, and a second speaker; the first sounder and the second sounder are connected via the first wireless transceiver and the second wireless transceiver, wherein the second sound effect value provider provides second signal encoding information for channels to the second sound effect generator to generate a second sound effect output signal so that the second speaker outputs the second sound effect output signal;
   wherein the first sounder further comprises a synchronizer used to generate a synchronous control signal to the first sound effect value provider, and the first wireless transceiver sends the synchronous control signal to the second wireless transceiver so that the second sound effect value provider obtains the synchronous control signal and synchronizes the output timeline of the first sound effect output signal with the second sound effect output signal;
   wherein the first sound effect output signal generated by the first sound effect generator at least includes a first stereo sound output signal, and the second sound effect output signal generated by the second sound effect generator at least includes a second stereo sound output signal; the first stereo sound output signal and the second stereo sound output signal are designed to be corresponding stereo sound output signals, and after the timeline is synchronized, the time that the first speaker outputs the first stereo sound output signal is m seconds later than the time that the second speaker outputs the second stereo sound output signal, wherein $0.0000001\ s \le m \le 0.3\ s$.

2. The true wireless multichannel-speakers device as claimed in claim 1, wherein the first signal encoding information and the second signal encoding information are the same.

3. The true wireless multichannel-speakers device as claimed in claim 1, wherein the first signal encoding information and the second signal encoding information are different.

4. The true wireless multichannel-speakers device as claimed in claim 1, wherein the first sound effect value provider sends the second signal encoding information to the second wireless transceiver through the first wireless transceiver, and the second sound effect value provider obtains the second signal encoding information to provide to the second sound effect generator so that the output timeline of the first sound effect output signal and the second sound effect output signal are synchronized.

5. The true wireless multichannel-speakers device as claimed in claim 1, wherein the second sound effect generator first uses the signal encoding information to synchronize the timeline, and after a period of time, if no signal encoding information is sent, the second sound effect generator sends the synchronous control signal to synchronize the timeline.

6. The true wireless multichannel-speakers device as claimed in claim 1, wherein the first sound effect value provider and the second sound effect value provider are the same type of module.

7. The true wireless multichannel-speakers device as claimed in claim 1, wherein the first sound effect generator is configured according to a first channel preset stereo sound so that the generated first sound effect output signal contains the first stereo sound output signal; the second sound effect generator is configured according to a second channel preset stereo sound so that the generated second sound effect output signal contains the second stereo sound output signal.

8. The true wireless multichannel-speakers device as claimed in claim 1, wherein the first sound effect value provider is used to generate first signal encoding information including a first channel stereo sound config value so that the first sound effect output signal generated by the first sound effect generator contains the first stereo sound output signal;

the second sound effect value provider is used to generate second signal encoding information including a second channel stereo sound config value so that the second sound effect output signal generated by the second sound effect generator contains the second stereo sound output signal.

9. The true wireless multichannel-speakers device as claimed in claim 1, wherein after the timeline is synchronized, the gain value of the first stereo sound output signal output by the first speaker is less than the gain value of the second stereo sound output signal output by the second speaker.

10. The true wireless multichannel-speakers device as claimed in claim 6, wherein the first sound effect value provider and the second sound effect value provider are both random number generators used to generate the first signal encoding information and the second signal encoding information, respectively.

11. The true wireless multichannel-speakers device as claimed in claim 6, wherein the first sound effect value provider is used to store a first preset value as the first signal encoding information, and the second sound effect value provider is used to store a second preset value as the second signal encoding information.

12. The true wireless multichannel-speakers device as claimed in claim 6, wherein the first sounder further comprises an angle detector used to detect a rotation angle or a tilt angle, and the first sound effect value provider and the second sound effect value provider receive the value returned by a detector as the first signal encoding information and the second signal encoding information so that the signal encoding information of each channel can be used to design the first sound effect output signal and the second sound effect output signal as corresponding stereo sound output signals according to the rotation angle or the tilt angle.

13. A multiple sound-source voicing method, used for a true wireless multichannel-speakers device, the true wireless multichannel-speakers device at least comprising a first sounder and a second sounder, wherein the first sounder comprises a first sound effect generator, a first sound effect value provider, a first wireless transceiver, and a first speaker, and the second sounder comprises a second sound effect generator, a second sound effect value provider, a second wireless transceiver, and a second speaker; the first sounder and the second sounder are connected via the first wireless transceiver and the second wireless transceiver; the method comprising the following steps:
providing first signal encoding information for channels to the first sound effect generator through the first sound effect value provider to generate a first sound effect output signal;
enabling the first speaker to output the first sound effect output signal;
providing second signal encoding information for channels to the second sound effect generator through the second sound effect value provider to generate a second sound effect output signal;
enabling the second speaker to output the second sound effect output signal;
generating a synchronous control signal through the first synchronizer;
sending the synchronous control signal to the second wireless transceiver through the first wireless transceiver so that the second sound effect value provider obtains the synchronous control signal; and
synchronizing the output timeline of the first sound effect output signal with the second sound effect output signal;
wherein:
the step of generating the first sound effect output signal through the first sound effect generator at least includes generating a first stereo sound output signal;
the step of generating the second sound effect output signal through the second sound effect generator at least includes generating a second stereo sound output signal, wherein the first stereo sound output signal and the second stereo sound output signal are designed as corresponding stereo sound output signals; and
after the timeline is synchronized, making the time that the first speaker outputs the first stereo sound output signal m seconds later than the time that the second speaker outputs the second stereo sound output signal, wherein $0.0000001 \leq m \leq 0.3$ s.

14. The multiple sound-source voicing method as claimed in claim 13, wherein the first signal encoding information and the second signal encoding information are the same.

15. The multiple sound-source voicing method as claimed in claim 13, wherein the first signal encoding information and the second signal encoding information are different.

16. The multiple sound-source voicing method as claimed in claim 13, further comprising the following steps:
sending the second signal encoding information to the second wireless transceiver through the first wireless transceiver so that the second sound effect value provider obtains the second signal encoding information to provide to the second sound effect generator; and
synchronizing the output timeline of the first sound effect output signal with the second sound effect output signal.

17. The multiple sound-source voicing method as claimed in claim 13, further comprising the following steps:
using the signal encoding information to synchronize the timeline first;
after a period of time, if no signal encoding information is sent, the synchronous control signal is sent to synchronize the timeline.

18. The multiple sound-source voicing method as claimed in claim 13, further comprising the step of setting the first sound effect value provider and the second sound effect value provider to the same type of module.

19. The multiple sound-source voicing method as claimed in claim 13, further comprising the following steps:
according to a configuration of a first channel preset stereo sound of the first sound effect generator, enabling the first sound effect output signal to be generated to include the first stereo sound output signal; and
according to a configuration of a second channel preset stereo sound of the second sound effect generator, enabling the second sound effect output signal to be generated to include the second stereo sound output signal.

20. The multiple sound-source voicing method as claimed in claim 13, further comprising the following steps:
storing a first channel stereo sound config value in the first sound effect value provider so that the first sound effect output signal generated by the first sound effect generator contains the first stereo sound output signal; and
storing a second channel stereo sound config value in the second sound effect value provider so that the second sound effect output signal generated by the second sound effect generator contains the second stereo sound output signal.

21. The multiple sound-source voicing method as claimed in claim 13, further comprising the following step:
after the timeline is synchronized, making the gain value of the first stereo sound output signal output by the first speaker be less than the gain value of the second stereo sound output signal output by the second speaker.

22. The multiple sound-source voicing method as claimed in claim 18, further comprising the step of using a random number generator to generate the first signal encoding information and the second signal encoding information, respectively.

23. The multiple sound-source voicing method as claimed in claim 18, further comprising the following steps:
storing a first preset value as the first signal encoding information in the first sound effect value provider; and
storing a second preset value as the second signal encoding information in the second sound effect value provider.

24. The multiple sound-source voicing method as claimed in claim 18, further comprising the following steps:
detecting a rotation angle or a tilt angle; and
receiving the value returned by a detector as the first signal encoding information and the second signal encoding information respectively through the first sound effect value provider and the second sound effect value provider so that the signal encoding information of each channel can be used to design the first sound effect output signal and the second sound effect output signal as corresponding stereo sound output signals according to the rotation angle or the tilt angle.

* * * * *